US008843348B2

(12) United States Patent
Pascu et al.

(10) Patent No.: US 8,843,348 B2
(45) Date of Patent: Sep. 23, 2014

(54) ENGINE NOISE MONITORING AS ENGINE HEALTH MANAGEMENT TOOL

(75) Inventors: Victor Pascu, San Diego, CA (US); Jay M. Francisco, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 474 days.

(21) Appl. No.: 13/159,483

(22) Filed: Jun. 14, 2011

(65) Prior Publication Data
US 2012/0323531 A1 Dec. 20, 2012

(51) Int. Cl.
| G01M 13/04 | (2006.01) |
| G01M 13/02 | (2006.01) |
| G01M 15/00 | (2006.01) |
| F01D 17/02 | (2006.01) |

(52) U.S. Cl.
CPC ............ *G01M 13/028* (2013.01); *G01M 15/00* (2013.01); *F01D 17/02* (2013.01); *F05D 2270/707* (2013.01); *F05D 2260/80* (2013.01)
USPC ........... 702/184; 702/183; 702/185; 701/100; 701/111; 701/32.1; 73/61.63; 73/593; 73/114.77

(58) Field of Classification Search
CPC ..... G01M 13/028; C01M 15/00; F01D 17/02; F05D 2260/80; F05D 2270/07
USPC ................. 702/35, 75, 76, 77, 183, 184, 185; 701/32.1, 100, 111; 73/61.63, 114.77, 73/114.79, 114.81, 593, 660
See application file for complete search history.

(56) References Cited

U.S. PATENT DOCUMENTS

| 4,249,238 | A | * | 2/1981 | Spang et al. ................... 701/100 |
| 4,429,578 | A | | 2/1984 | Darrel et al. |
| 4,685,335 | A | | 8/1987 | Sato et al. |
| 5,309,379 | A | | 5/1994 | Rawlings et al. |
| 6,119,074 | A | * | 9/2000 | Sarangapani ................. 702/185 |
| 6,389,887 | B1 | * | 5/2002 | Dusserre-Telmon et al. .......................... 73/114.77 |
| 6,526,356 | B1 | * | 2/2003 | DiMaggio et al. .............. 702/35 |
| 6,643,570 | B2 | * | 11/2003 | Bangert et al. ............... 701/32.1 |
| 6,659,712 | B2 | | 12/2003 | Brooks et al. |
| 6,668,655 | B2 | | 12/2003 | Harrold et al. |
| 6,711,952 | B2 | | 3/2004 | Leamy et al. |
| 6,775,642 | B2 | * | 8/2004 | Remboski et al. ............ 702/185 |
| 6,999,884 | B2 | | 2/2006 | Astley et al. |
| 7,027,909 | B2 | * | 4/2006 | deBotton et al. .............. 701/111 |

(Continued)

FOREIGN PATENT DOCUMENTS

| AT | 389943 B | 2/1990 |
| EP | 1609955 B1 | 9/2008 |

OTHER PUBLICATIONS

The European Search Report mailed Oct. 26, 2012 for European Application No. 12162769.9.

(Continued)

*Primary Examiner* — Carol S Tsai
(74) *Attorney, Agent, or Firm* — Kinney & Lange, P.A.

(57) ABSTRACT

A system and method are provided for determining the health of an engine. The method includes a plurality of standard noise spectra collected from engines with known defects. A noise spectrum of the engine being monitored is sensed and compared to the plurality of standard noise spectra from the engines with known defects. From the comparison, a type and a degree of defect is identified based upon the comparison.

17 Claims, 2 Drawing Sheets

(56) References Cited

U.S. PATENT DOCUMENTS

| | | | | |
|---|---|---|---|---|
| 7,027,953 | B2* | 4/2006 | Klein | 702/184 |
| 7,318,007 | B2 | 1/2008 | Barkhoudarian | |
| 7,400,943 | B2* | 7/2008 | Vian et al. | 700/279 |
| 7,591,183 | B2* | 9/2009 | King | 73/660 |
| 7,613,687 | B2* | 11/2009 | Nye | 1/1 |
| 7,769,507 | B2* | 8/2010 | Volponi et al. | 701/31.6 |
| 8,417,432 | B2 | 4/2013 | Butler | |
| 2003/0028332 | A1 | 2/2003 | DiMaggio et al. | |
| 2003/0135310 | A1* | 7/2003 | Bangert et al. | 701/29 |
| 2004/0236494 | A1* | 11/2004 | DeBotton et al. | 701/111 |
| 2005/0096873 | A1* | 5/2005 | Klein | 702/184 |
| 2005/0120006 | A1* | 6/2005 | Nye | 707/3 |
| 2005/0177352 | A1 | 8/2005 | Gravel | |
| 2006/0047403 | A1* | 3/2006 | Volponi et al. | 701/100 |
| 2007/0056376 | A1* | 3/2007 | King | 73/660 |
| 2009/0107219 | A1* | 4/2009 | Douglas | 73/61.63 |
| 2010/0161255 | A1 | 6/2010 | Mian et al. | |
| 2010/0281843 | A1 | 11/2010 | Smith | |
| 2012/0272736 | A1* | 11/2012 | Griffaton | 73/593 |
| 2012/0304164 | A1 | 11/2012 | van der Zweep et al. | |
| 2012/0323531 | A1 | 12/2012 | Pascu et al. | |

OTHER PUBLICATIONS

Scheidel, Michael et al., "Use and Experience of Gas Turbine On-line Diagnostics", 2004.

Office Action dated Feb. 26, 2013, for U.S. Appl. No. 13/167,490.

Office Action dated Nov. 18, 2013, for U.S. Appl. No. 13/167,490.

* cited by examiner

ENGINE NOISE MONITORING AS ENGINE HEALTH MANAGEMENT TOOL

BACKGROUND

The invention relates to a system and method for monitoring the health of engines, and more particularly to monitoring the health of gas turbine engines and auxiliary power units (APUs) using acoustic data.

Aircraft gas turbine engine and APU diagnostic data is available from a variety of sources including on-board sensors such as accelerometers, which monitor rotating machinery and gears to determine vibration signatures related to particular types of component defects. However, many sensors such as accelerometers are intrusive and can be difficult to install or reinstall when components are replaced, cleaned or lubricated. Additionally, accelerometers respond to the combined resonances of all components including gears, shaft(s), bearings, blades, housing, and other moving components. This makes it difficult in some instances to isolate and identify certain types of component defects such as gear tooth defects.

SUMMARY

A system and method are provided for determining the health of an engine. The method includes accessing a plurality of standard noise spectra collected from engines with known defects. A noise spectrum of the engine being monitored is sensed and compared to the plurality of standard noise spectra from the engines with known defects. From the comparison, a type and a degree of defect is identified based upon the comparison.

The system for monitoring the health of the engine includes an acoustic sensor and a computer system. The acoustic sensor is configured to acquire the noise spectrum of the engine. The computer system has a database with a plurality of stored standard noise spectra from engines with known defects and is configured to receive the acquired acoustic spectrum of the engine from the acoustic sensor. The computer system compares the acoustic spectrum of the engine to the plurality of standard noise spectra from engines with known defects so as to identify a type and a degree of defect based upon the comparison. Additionally, the computer system generates a match alert along with an applicable recommended action on a display if one or more defects are identified.

DETAILED DESCRIPTION

Figure 1:
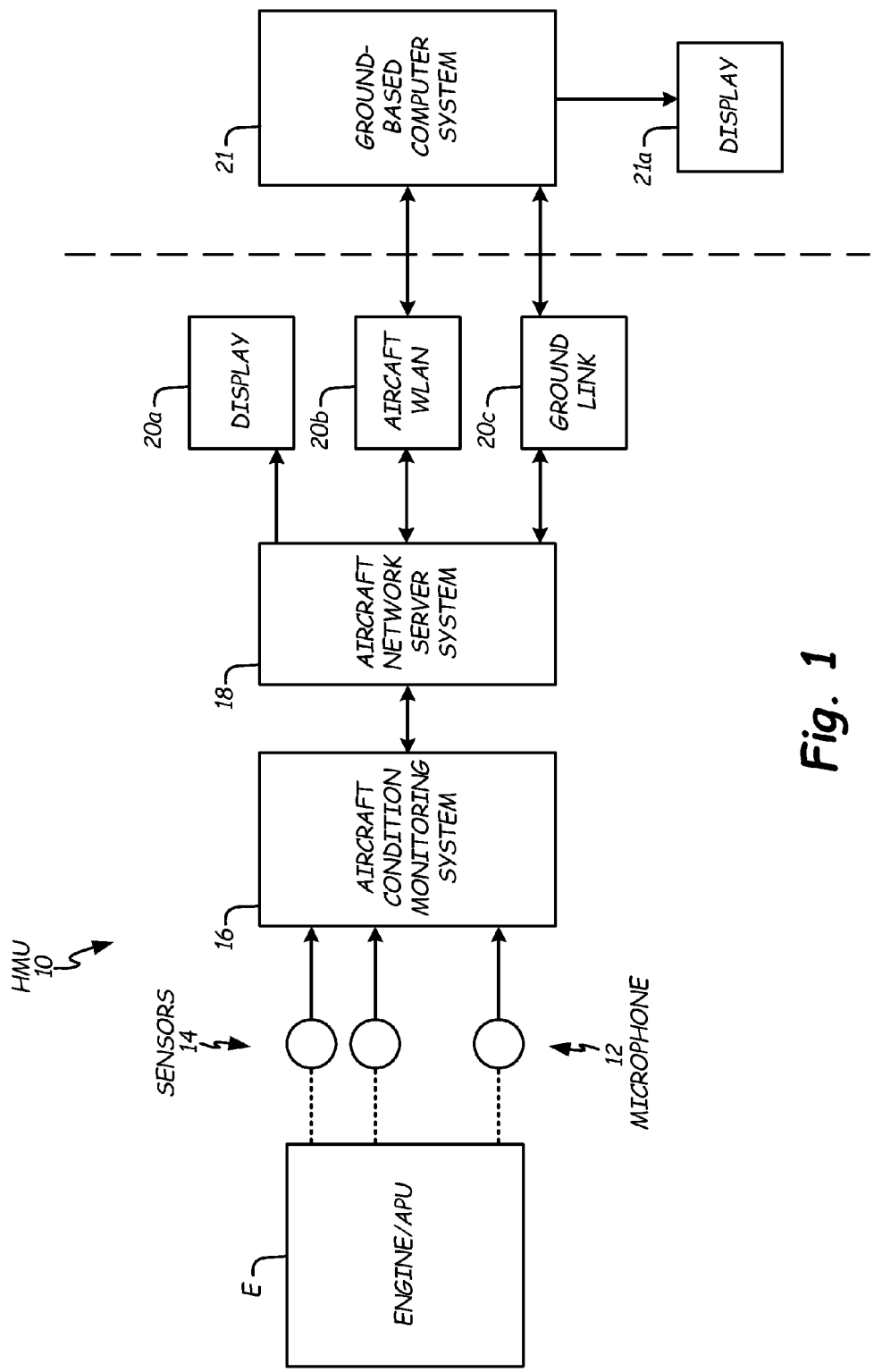
FIG. 1 is a schematic example of a health monitoring system for a gas turbine engine or APU.

FIG. 1 shows a schematic example of a health monitoring system 10 that is used to identify and/or prevent component damage in gas turbine engines and APUs (referred to synonymously as "engines" herein, since APUs include engines). Health monitoring system 10 is illustrated for exemplary purposes, various airframers and/or commercial airline operators may employ different or modified systems in order to identify component damage in order to prevent component failure. Heath monitoring system 10 monitors engine E (a gas turbine engine or APU) and includes a microphone 12, additional sensors 14, an aircraft condition monitoring system 16, an aircraft network server system 18, a display 20a, and transfer methods such as an aircraft wireless local area network 20b, and a ground link 20c to communicate with a ground based computer system 21. Computer system 21 displays results on a display 21a.

Health monitoring system 10 recognizes that the change of engine noise spectrum at similar operating conditions is a direct indication of a change of the engine's mechanical functionality. Microphone 12 is an acoustic sensor that can be mounted on engine E or can be mounted adjacent thereto, for example, in a compartment that houses the APU in a tail of the aircraft. In one embodiment, microphone 12 has a frequency range of between 25 hertz to 20 kilohertz and comprises a commercially available ceramic microphone utilizing a piezoelectric sensor that is capable of surviving at extreme conditions, in a non-pressurized and non-temperature controlled environment. In other embodiments, microphone 12 can be custom made to meet the above criteria.

As is known in the art, and disclosed in U.S. Pat. No. 7,769,507 to Volponi et al., the disclosure of which is incorporated herein by reference, additional sensors 14 collect data regarding a variety of components and conditions of engine E. Additional sensors 14 collect data on flow temperature and pressure, flow speeds, oil temperatures and pressures, oil debris, eddy currents, electrostatic debris, and vibration levels from gas turbine engine or APU E.

Data from microphone 12 and additional sensors 14 is transmitted to aircraft condition monitoring system 16, which performs two primary functions. The first function of aircraft condition monitoring system 16 resides in a central data acquisition module which identifies the condition of the engine E and identifies when data collection should occur during certain operating conditions (e.g., no load, main engine start). Additionally, aircraft condition monitoring system 16 includes a data acquisition system which is dedicated to the acquisition and real time collection of aircraft data including data from microphone 12 and additional sensors 14 when specific conditions or triggers are met. Aircraft condition monitoring system 16 has the capability of generating a plurality of condition reports including, for example, a noise monitoring report, load report, incident report, and start report. Condition reports typically include information such as acquisition time of data, date, flight number, report number, report type, and information regarding the operating condition monitored. In some embodiments, aircraft condition monitoring system 16 has the capability of processing data utilizing standard techniques such as Fast Fourier Transforms (FFT) and other spectral and waveform analysis.

Condition reports may be transferred to and stored on aircraft network server system 18 until the condition reports are transferred for processing and storage off the aircraft. In one embodiment, the reports are also available to pilots or other personnel in the cockpit via display 20a, which may be, for example, a cockpit terminal. Means of transfer of data and reports off the aircraft include via the aircraft's communication system such as by aircraft wireless local area network 20b or via ground link 20c. These means of data and report transfer allow a ground based computer system 21 such as a multi-purpose digital computing device to perform analysis on the spectral data recorded from the engine E. In one embodiment, computer system 21 comprises a multi-purpose digital computing device with standard components such as a processor, memory and display 21a but also includes a database of stored standard noise spectra of similar or identical model engines with known defects and without defects. Additionally, digital computer 21 includes software developed to identify similarities based on pattern recognition between the noise spectrum of the noise monitoring report and standard noise spectrums recorded from engines known to be operating with defects and without defects.

Figure 2:
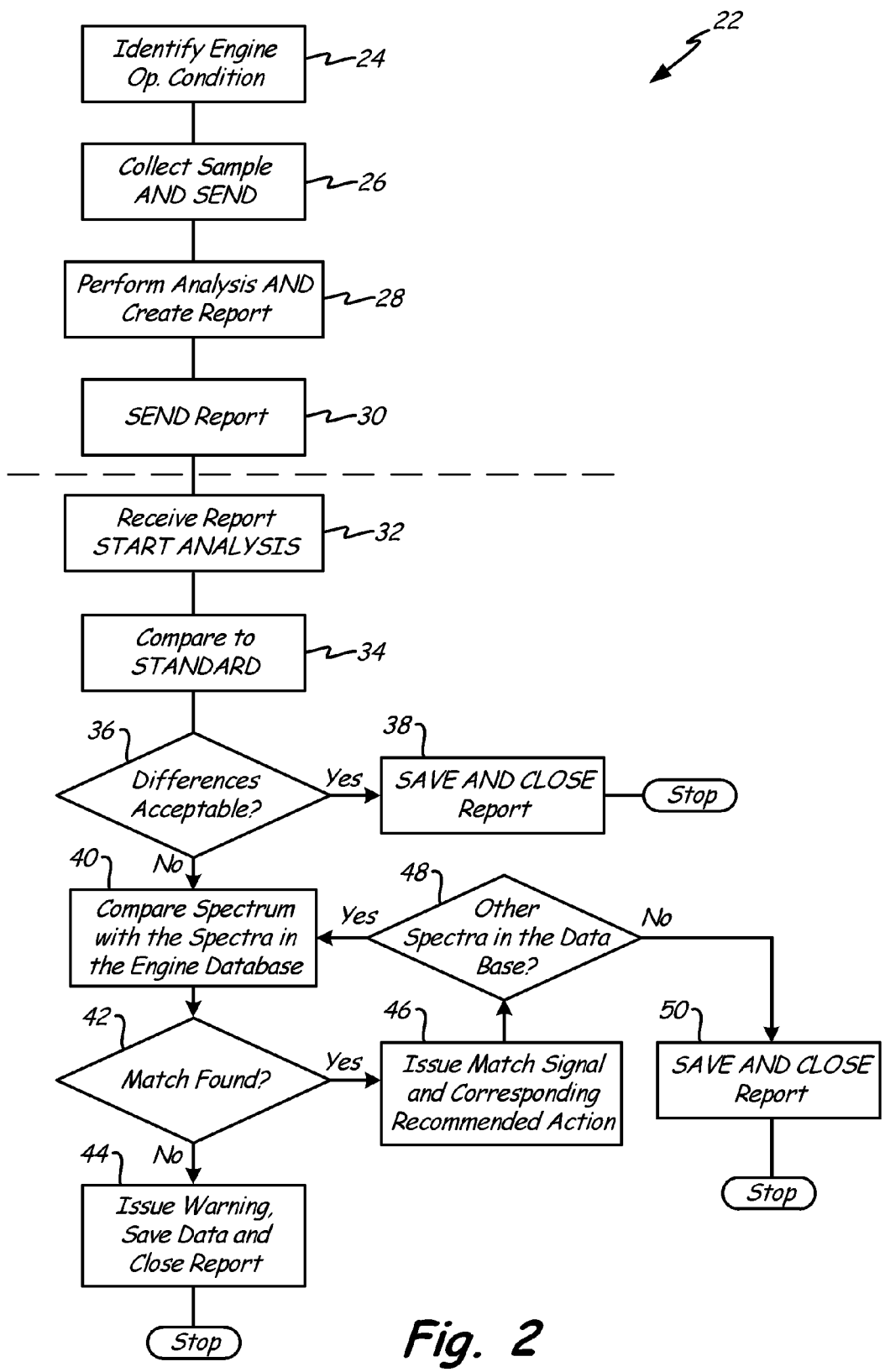
FIG. 2 is a flow diagram of a processing method that is used by to detect the existence of component damage using a noise spectrum of the gas turbine engine or APU.

FIG. 2 shows a flow diagram of a processing method 22 that can be used by computer system 21 to detect the existence of component damage using a noise spectrum of the engine E. Processing method 22 begins with an identification step 24 as aircraft condition monitoring system 16 (FIG. 1) identifies an engine operating condition that warrants noise analysis such as a no load condition or a main engine start condition. If aircraft condition monitoring system 16 identifies an engine operating condition that warrants noise analysis, processing method 22 proceeds to a data collection step 26, where aircraft condition monitoring system 16 collects noise data during the applicable operating condition. Collected noise data can either be sent directly to aircraft network server system 18 (FIG. 1) without processing, or processing such as performing a Fast Fourier Transform can be performed as to reduce the overall size of the noise data collected by eliminating some noise spectrum results not applicable to components being monitored.

After the data is collected, the processing method 22 moves to report generation step 28 where a noise monitoring report is generated from the collected data. The noise monitoring report is stored on aircraft network server system 18 and is sent off the aircraft through the aircraft's communication systems at step 30 to computer system 21. Once the noise monitoring report is received on the ground, spectrum analysis can be performed during step 32. Spectrum analysis can include standard noise processing techniques such as performing a Fast Fourier Transform (FFT) in order to decompose noise spectrum data into values at discrete frequencies. At step 34, the computer system 21 accesses the database and compares the noise spectrum of the noise monitoring report to the standard noise spectrum of a same or similar model reference engine known to be operating without defects at the same or similar operating conditions. In step 36, if the differences between the noise spectrum of the noise monitoring report and the standard noise spectrum are found to be acceptable after analysis by software developed to identify similarities based on pattern recognition between the noise spectrum of the noise monitoring report and the standard noise spectrum, the processing method 22 will move to step 38. The software the computer system 21 applies models and types of pattern recognition analysis, for example, if the difference between the noise spectrum and the standard noise spectrum in a particular frequency range are within a certain statistical range of one another (determined by component reliability information, known failure modes, and maintenance recommendations) the difference would be determined to be acceptable. If no damage is determined to have occurred in step 36, processing method 22 proceeds to step 38, where the noise monitoring report is saved and closed.

If the differences between the noise spectrum of the noise monitoring report and the standard noise spectrum are found not to be acceptable in step 36, processing method 22 moves to step 40, where the computer system 21 utilizing software applying pattern recognition analysis compares the noise spectrum of the noise monitoring report to a database of stored standard noise spectra of similar or identical model engines with known defects so as to identify what type of defect has occurred to the engine based on a pattern match between the noise spectrum of the engine being monitored and one or more of the engine noise spectra. The computer system 21 is able to accomplish this comparison and identification by accessing a database of collected standard noise spectra of similar or identical model engines with known defects. Additionally, the database allows the user of processing method 22 to identify not only the type of defect that has occurred but is capable of identifying the degree of component defect(s) within the engine being monitored. The processing method 22 has this capability because the database includes the noise spectra of engines with varying degrees of component damage. Thus, the type and degree of component defect is identified by a noise spectrum pattern match between the noise spectrum of the engine being monitored and one or more of the engine noise spectra.

The database of stored noise spectra used by computer system 21 in step 40 is created and developed by measuring the noise spectra of engines on test cells after the engines are returned for repair from the field. Additionally, the database of stored noise spectra used by the computer 21 in step 40 can include the noise spectra of engines that account for changes in air temperature and altitude by either utilizing feedback from temperature and pressure sensors 14 or by utilizing a learning system that records initial noise spectra at various operating conditions (including at various altitudes and air temperatures) of the engine being monitored upon entry into service. In the latter case, the initial noise spectra would be incorporated into the standard noise spectra of the database for comparison and identification of defects and types of defects using known learning algorithms such as neural networks and various other supervised, semi-supervised, and unsupervised machine learning algorithms. The engine noise spectra are measured at various operating conditions corresponding to operating conditions which aircraft condition monitoring system 16 (FIG. 1) identifies as an engine operating condition that warrants noise analysis (e.g., the no load condition or the main engine start condition). After engine noise testing, the engines are striped and repaired and the noise spectra measurements are correlated with shop findings and the results entered into the database. In this manner, the various noise spectra for different components both defect free and with varying degrees of defects can be ascertained. An non-exhaustive list of components with defects that can be identified using noise spectrum analysis include: compressor blades, combustor, turbine blades, gears, and bearings. Defects such as bent blades, blade tip loss, and bearing failure can be identified using the processing method 22.

If a pattern match is not found utilizing the database at step 42, the processing method 22 moves to step 44 where a notification is issued and displayed on display 21a to the user by computer system 21. The notification indicates that the noise spectrum of the engine being monitored was determined to have an unknown anomaly from a standard engine, and therefore, there is a likelihood of component damage to the engine E. The notification is saved by computer system 21 so that the engine E that was monitored can be identified for future noise spectrum health monitoring. Alternatively, the notification can serve as the basis for a maintenance inspection or a temporary removal of the engine from service for overhaul so as to identify the source (type and degree of component damage or failure) of the anomalous noise. At step 44, the noise monitoring report is then saved and closed.

If a pattern match is found utilizing the database at step 42, the processing method 22 proceeds to step 46 where a match alert is issued to the user. In one embodiment, the match alert displays a visual warning to the user on display 21a along with any applicable recommended action(s). The applicable recommended action(s) are based upon component reliability information, known failure modes, and maintenance recommendations from the maintainers' maintenance manual. The applicable recommended action(s) for corrective action include minor maintenance activities and preventative actions such as performing a maintenance inspection using a boroscope or major actions such as removing the engine from service for inspection and repair. Additionally, in one embodiment, recommended action(s) are based upon a cost/benefit analysis that takes into account a business model of the user. For example, if the cost to repair the damaged component for which the match alert was issued would be minimal and there is a high likelihood that the risk and cost of damage to the engine would escalate substantially if the engine was kept in service these factors would outweigh the potential benefit of keeping the engine in service. In such a case, the recommended action would be to remove the engine from service for repair.

After recommended action(s) are issued at step 46, processing method 22 moves to step 48, which determines if additional noise spectra in the database are applicable to the noise spectrum of the noise monitoring report. Thus, processing method 22 does not stop after identifying one damaged component but continues to search the database for additional damaged components that may exist. If no additional standard spectra are applicable to the noise spectrum of the noise monitoring report (i.e. no additional damage is ascertained), processing method 22 proceeds to step 50 where the results from the noise monitoring report are saved on computer system 21 and then closed. If additional standard spectra are applicable to the noise spectrum of the noise monitoring report, the processing method steps 40 and 42 are repeated and the appropriate warning of step 44 or the appropriate additional match alert of step 46 are issued until no additional noise spectra in the database are applicable.

By utilizing the noise spectrum of engine health monitoring system 10 and processing method 22, one can identify and/or prevent component damage in a non-intrusive manner without having to install sensors in the engine. Additionally, noise spectrum analysis according to the present method 22 detects not only the existence and type of component damage but also identifies the degree of damage within the engine based upon the database with standard noise spectra of similar or identical model engines with known degrees of defect (s). Identification of minor damage such as wear before the minor damage becomes catastrophic allows for preventative maintenance to be performed, and thereby, allows an optimized maintenance schedule that can save the user maintenance costs.

In this application, the terms anomaly, damage, defect, failure, and wear are used synonymously to refer to any condition that has a negative impact on performance, operation, or mechanical functionality of the engine. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for determining the health of an engine comprising:
    sensing a noise spectrum of the engine;
    comparing the noise spectrum of the engine to a plurality of standard noise spectra from engines with known defects stored in a database;
    identifying a type and a degree of defect based upon the comparison; and
    generating applicable recommended action if one or more defects are identified by a computer system based on a pattern match between the noise spectrum of the engine and one or more of the plurality of standard noise spectra, wherein the computer system generates the applicable recommended action based upon a cost/benefit analysis that is a function of at least a repair cost and a risk of damage to the engine.

2. The method of claim 1, further comprising:
    generating a match alert along with the applicable recommended action if the one or more defects are identified by the computer system based on the pattern match between the noise spectrum of the engine and the one or more of the plurality of standard noise spectra.

3. The method of claim 1, wherein the computer system generates applicable recommended action using component reliability information, known failure modes, and maintenance recommendations from a maintenance manual of the engine.

4. The method of claim 1, wherein the engine and the engines with known defects are identical models and the noise spectrum of the engine and the plurality of standard noise spectra from the engines with known defects are collected at a same or substantially similar operating condition.

5. The method of claim 1, further comprising:
    comparing the noise spectrum of the engine to a standard noise spectrum from a reference engine known to be operating without defects stored in the database to identify that defects are present.

6. The method of claim 4, further comprising:
    generating a notification that one or more defects are likely present if the noise spectrum of the engine and the standard noise spectrum from the reference engine known to be operating without defects are determined not to be an acceptable match based on a pattern recognition by a computer system.

7. The method of claim 1, and further comprising:
    comparing the noise spectrum of the engine to a standard noise spectra of a reference engine known to be operating without defects.

8. The method of claim 7, further comprising:
    generating a match alert along with the applicable recommended action if the one or more defects are identified by the computer system based on a pattern match between the noise spectrum of the engine and one or more of the plurality of standard noise spectra.

9. The method of claim 8, wherein the computer system generates an applicable recommended action based upon component reliability information, known failure modes, and maintenance recommendations from a maintenance manual of the engine.

10. The method of claim 7, further comprising:
    generating a notification that one or more defects are likely present if the noise spectrum of the engine and the standard noise spectrum from the reference engine known to be operating without defects are determined not to be an acceptable match based on a pattern recognition by the computer system.

11. The method of claim 7, wherein the engine and the engines with known defects are identical model engines and the noise spectrum of the engine and the plurality of standard noise spectra from the engines with known defects are collected at a same or substantially similar operating condition.

12. The method of claim 7, wherein the engine and the reference engine known to be operating without defects are identical model engines and the noise spectrum of the engine and the standard noise spectra of the reference engine known to be operating without defects are collected at a same or substantially similar operating condition.

13. A system for monitoring the health of an engine comprising:
an acoustic sensor configured to acquire a noise spectrum of the engine; and
a computer system including a database having a plurality of stored standard noise spectra from engines with known defects, the computer system configured to receive the acquired noise spectrum of the engine from the acoustic sensor and compare the noise spectrum of the engine to the plurality of standard noise spectra from engines with known defects so as to identify a type and a degree of defect based upon the comparison, the computer system generating a match alert along with an applicable recommended action on a display if one or more defects are identified, wherein the computer system generates the applicable recommended action based upon a cost/benefit analysis that is a function of at least a repair cost and a risk of damage to the engine.

14. A system for monitoring the health of an engine comprising:
an acoustic sensor configured to acquire a noise spectrum of the engine, wherein the acoustic sensor communicates with an aircraft condition monitoring system which identifies the condition of the engine and identifies when data collection from the acoustic sensor and a plurality of other sensors should occur based upon desired engine operating conditions, the aircraft condition monitoring system including a data acquisition system dedicated to the acquisition and real time collection of aircraft data including data from the acoustic sensor and the plurality of other sensors; and
a computer system including a database having a plurality of stored standard noise spectra from engines with known defects, the computer system configured to receive the acquired noise spectrum of the engine from the acoustic sensor and compare the noise spectrum of the engine to the plurality of standard noise spectra from engines with known defects so as to identify a type and a degree of defect based upon the comparison, the computer system generating a match alert along with an applicable recommended action on a display if one or more defects are identified, wherein the computer system generates the applicable recommended action based upon a cost/benefit analysis that is a function of at least a repair cost and a risk of damage to the engine.

15. The system of claim 13, wherein the database stores a standard noise spectrum from a reference engine known to be operating without defects and the computer system compares the noise spectrum of the engine to the standard noise spectrum from the reference engine known to be operating without defects to ascertain whether any defects are present.

16. The system of claim 15, wherein the computer system generates a notification that one or more defects are likely present on the display if the noise spectrum of the engine and the standard noise spectrum from the reference engine known to be operating without defects are determined not to be an acceptable match based on a pattern recognition.

17. The system of claim 13, wherein the computer system generated applicable recommended action is derived from component reliability information, known failure modes, and maintenance recommendations from a maintenance manual of the engine.

* * * * *